United States Patent [19]

Barwig et al.

[11] Patent Number: 4,941,720
[45] Date of Patent: Jul. 17, 1990

[54] OPTICAL CABLE NETWORK WITH AN EXCESS NUMBER OF LEADS IN RESERVE

[75] Inventors: Karlhorst Barwig, Herrsching; Gerd Ortkrass, Egling; Guenther Klimasek, Berlin, all of Fed. Rep. of Germany

[73] Assignee: Siemens Aktiengesellschaft, Berlin and Munich, Fed. Rep. of Germany

[21] Appl. No.: 307,009

[22] Filed: Feb. 7, 1989

[30] Foreign Application Priority Data

Mar. 15, 1988 [DE] Fed. Rep. of Germany ....... 3808664

[51] Int. Cl.⁵ .............................................. G02B 6/36
[52] U.S. Cl. ................................................. 350/96.2
[58] Field of Search .................. 350/96.2, 96.21, 96.15

[56] References Cited

U.S. PATENT DOCUMENTS 4,765,709  8/1988  Suillerot et al. .................... 350/96.2
4,805,979  2/1989  Bossard et al. ..................... 350/96.2

FOREIGN PATENT DOCUMENTS 57-144511   9/1982  Japan .................................. 350/96.2
58-221818  12/1983  Japan .................................. 350/96.2
61-73907    4/1986  Japan .................................. 350/96.2

Primary Examiner—William L. Sikes
Assistant Examiner—John Ngo
Attorney, Agent, or Firm—Hill, Van Santen, Steadman & Simpson

[57] ABSTRACT

An optical cable network constructed with light waveguide cables for one or more transmission systems comprising a plurality of existing and planned connecting points for individual system nodes. In order to facilitate the network set-up, as well as the network expansion, all existing and planned connecting points of an optical cable network are connected in series with one another by means of through extending light waveguide cables that comprise a plurality of fibers. All fibers are laid in the multiple loops at each connecting point for the formation of a cable reserve, with only the fibers needed for a system connection being cut and spliced to components for the connecting point.

6 Claims, 1 Drawing Sheet

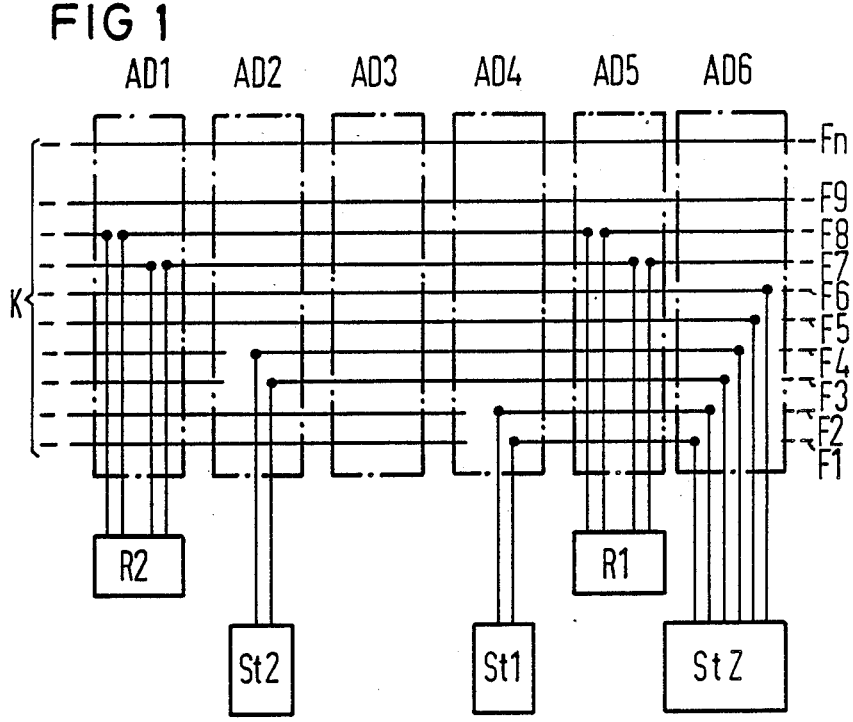
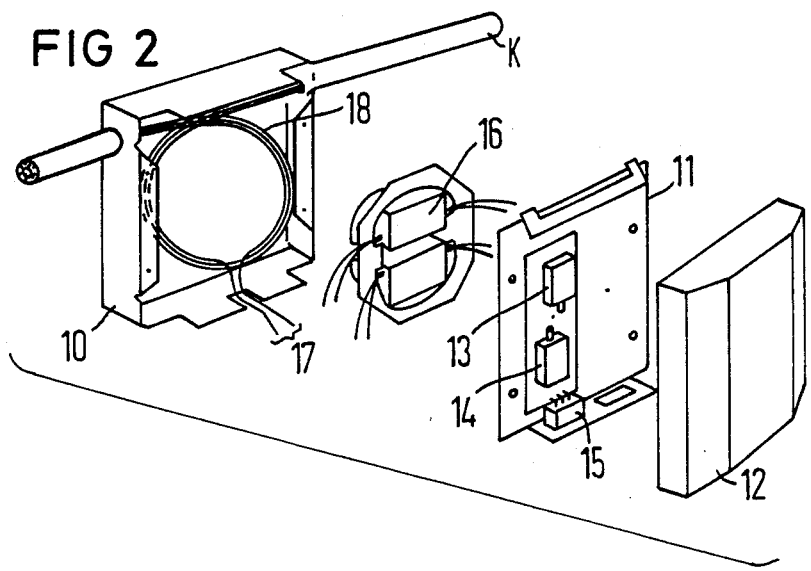

OPTICAL CABLE NETWORK WITH AN EXCESS NUMBER OF LEADS IN RESERVE

BACKGROUND OF THE INVENTION

The present invention is directed to an optical cable network constructed with light waveguide cables for one or more transmission systems including ring systems, star systems and bus systems, said network comprising a plurality of existing and, respectively, planned connecting points for individual system nodes.

Local-area networks, which are referred to as LANs, are playing an increasing part within present-day communication system. The optical local networks constructed with light waveguides are of great significance in turn within these local area networks. Optical networks comprise a number of advantages over electrical networks. Among other things, a considerable simplified laying of the optical cable in comparison to laying of the electrical network occurs because of the smaller dimensions of the optical cable and because of the lower weight of the optical cable. This is opposed by a disadvantage in an optical network in comparison to electrical network that the interconnects and distribution of light waveguides is not as unproblematical as with electrical conductors because every connection in an optical network between two light waveguides leads to an attenuation loss.

The maximally allowable link attenuation in an optical cable network is determined by the output power of the transmitter and by the input sensitivity of the receiver. What is understood by link attenuation is the maximum loss on the path between two arbitrary terminals of a transmission system. The link attenuation is essentially composed of the line attenuation and of the auxiliary attenuations. The auxiliary attenuations are caused by aging, repair splices, optical distributors (attenuation per connector location of $\leq 1$ dB), splices (0.1–0.2 dB), optical relays (insertion attenuation of 1–1.5 dB) and by the shortening of the bridgeable link length due to dispersion in the light waveguide.

Within the present-day optical cable networks which comprise one or more transmission systems, the cabling of the light waveguides almost always occurs with the assistance of light waveguide distributors. These light waveguide distributors serve the purpose of branching light waveguide cables, as well as the purpose of problem-free reconfiguration or, respectively, connecting new optical fiber paths or optical fiber rings. Light waveguide distributors are also very frequently provided as a prior foundation for potential enlargement of the optical network.

When one assumes that a plug connection between two light waveguide leads can cause an additional attenuation of up to 1 dB, then the disadvantage of light waveguide distributors and plug connections are universally obvious for the set-up of optical cable networks.

SUMMARY OF THE INvENTION

An object of the present invention is to provide an optical cable network of the above-noted types that guarantees easy installation and expandability of optical, local-area networks, given a low cost prior foundation without thereby causing additional attenuation losses.

This object is inventively achieved in an optical cable network including one or more transmission systems, such as ring systems, star systems, and bus systems, wherein all the existing and, additionally, planned connecting points of the optical cable network are connected in series with one another by means of a prescribed plurality of through light waveguide leads with each lead being composed of two fibers in one or more light waveguide cables, the plurality being defined based on the maximum size of the network in that the through light waveguide leads are laid in a plurality of loops per connecting point for the formation of cable reserve and only that light waveguide lead or, respectively, those light waveguide leads required for a system connection are parted, whereby the corresponding light waveguide leads are joined to the corresponding system component on the basis of a splicing technology.

The optical cable network of the present invention can be easily installed with little prior cost and can also be easily expanded as needed. The prior costs are merely composed of the employment of one or more cables in which additional light waveguide optical fibers are provided for future applications and is further composed of the formation of cable reserves by cable loops which are provided respectively at each of the original and planned connecting points. Since the principle costs incurred are the actual laying work for the cable, the added cost due to the additional fibers and the cable loops are of no substantial consequence.

The easy installation and/or expansion of the optical cable network of the invention occurs from the fact that during installation or, respectively, expansion of the optical cable network, the corresponding optical fiber that has to be parted only at one or more connecting points in order to subsequently join the free ends to the respective system component with splices. A further significant advantage of the cable network of the present invention is that an easy expandability of the network is enabled without employing branching or, respectively, optical distributors as previous done. The expansion leads to practically no additional attenuation loss. Because of this reduced losses for attenuation, greater distances can be bridged with the local optical network of the present invention when compared to traditional networks.

An expedient development of the network of the invention is characterized in that the formation of the cable reserve respectively occurs inside a connector box in which the system component needed for a connection are also situated. A surveyable and clear network format occurs due to the formation of the cable reserves inside the connector boxes including those connector boxes which are not in use in the system during the initial installation.

Other practical developments of the cable network of the present invention will be readily apparent from the following description of the preferred embodiments, the drawings and claims.

BRIEF DESCRIPTION OF THE DRAWINGS

FIG. 1 is a schematic illustration of a portion of an optical cable network constructed in accordance with the present invention; and FIG. 2 is an exploded perspective view of a connector box with cable reserve employed in an optical cable network constructed in accordance with the present invention.

DESCRIPTION OF THE PREFERRED EMBODIMENTS

The principles of the present invention are particularly useful in a portion of the optical cable network, as schematically illustrated in FIG. 1. Only those parts of the network needed for an understanding of the invention are shown. The illustrated embodiment assumes an optical cable network wherein all the connecting points, i.e., the connecting boxes, are connected with a cable K that comprises n light waveguide fibers F1-Fn. In the illustrated embodiment of FIG. 1, only the connector boxes AD1-AD6 are shown. The partially illustrated optical network has two transmission systems, one being a star system and the other being a ring system.

Of the star-shaped transmission system, FIG. 1 shows the central terminal or station StZ can be fashioned as an active optical star and has two terminals St1 and St2 that belong to this transmission system. The connector boxes AD2, AD4 and AD6 are allocated to this star system. Light waveguide fibers F1-F6 are also used by this system, with only the illustrated portions being considered. Each dot in FIG. 1 denotes a splice. It should be mentioned that, in this context, the two fibers are combined to form a light waveguide lead in the illustrated exemplary embodiment. Since the light waveguide cable K connects all connecting points of the optical cable network to one another, it can be seen that the same fibers can be allocated to different systems corresponding to their topical position. Proceeding on the basis of the exemplary embodiment, the fiber sections of the fibers F1-F2 that lie at the left of the terminal St1 and St2 can be employed for cabling other systems without having to install new cables or fibers.

FIG. 1 also shows a part of a ring system that comprises terminals R1 and R2. The fibers F7 and F8 are allocated to this ring system in the illustrated exemplary embodiment. The connection of the terminals of the ring system occur from FIG. 1. Technical details of the coupling of the terminals shall not be discussed in greater detail here, since these are conventional and not critical to the present invention.

The fibers F9-Fn in the illustrated embodiment would be reserve fibers that would be placed in use given a later expansion of the optical local-area network. Since the future, maximum extent is usually predictable given a new installation of an optical cable system, it is possible to immediately lay the optimum plurality of light waveguide fibers upon new installation of the network.

The connector box AD3 shown in FIG. 1 is a connecting point that will be provided later in the optical cable network. This connector box AD3 can serve the purpose of connecting a terminal to an arbitrary, third transmission system that is not shown. The connector box AD3, however, can also be used to expand the existing ring system by a terminal between the existing terminals R1 and R2. It would also be conceivable to expand the illustrated star-shaped transmission system by a station St3 via the connector box AD3 with the assistance of two fibers of the reserve fibers F9-Fn. The enormous flexibility of the optical cable system of the invention, given set-up as well as given a potential expansion, is readily apparent from these few examples.

FIG. 2 shows a perspective view of a connector box AD. A cable K is stripped of installation within the connector box and the individual light waveguide leads are laid into a plurality of loops 18. When a terminal of a transmission system is to be connected to this connector box, then only the lead provided for the system connection is cut or parted to form free ends 17. The free ends 17 of the parted light waveguide lead are connected to the system component with a splicing technique. Included among these system components, for example, are an optical transmitter 13 and an optical receiver 14, as well as a light waveguide relay 16. In the design of optical rings, it is also necessary, for safety reasons, to insert a light waveguide relay at the taps for a terminal. The light waveguide relay bridges the ring at this location when the station connected to the ring is malfunctioning or when the station is being disconnected from the ring. One part of the system components is accommodated on a receptacle plate 11, to which corresponding printed circuit boards can also be secured. A drop cable connector 15 is situated on the receptacle plate 11. The connector box is closed with a cover or cap 12.

The cable loops 18 are needed in order to attach splices to the free ends of the parted light waveguide fibers, given a later expansion of the optical, local-area network, since a defined fiber length preceding and following the splice is necessary for a splicing operation. On the other hand, these cable loops mean practically no additional attenuation for the through fibers.

Although various minor modifications may be suggested by those versed in the art, it should be understood that we wish to embody within the scope of the patent granted hereon all such modifications as reasonably and properly come within the scope of our contribution to the art.

We claim:

1. In an optical cable network constructed with light waveguide cables for one or more transmission systems selected from ring systems, star systems and bus systems, said cable network comprising a plurality of existing and, respectively, planned connecting points for individual system nodes, the improvements comprising all existing and, respectively, further planned connecting nodes of the optical cable network being connected in series with one another by means of a prescribed plurality of through light waveguide leads, which are each composed of two fibers, in one or more light waveguide cables, a number of leads of said plurality of through light waveguide leads being determined based on the maximum size of said network, each of the through light waveguide leads being laid in multiple loops at each connecting point for forming a cable reserve and only those light waveguide leads required for a system connection at each connecting point being cut to provide free ends which are connected to the system components by a splice.

2. In an optical cable network according to claim 1, wherein the formation of the cable reserve occurs inside a connector box, said connector box containing the system components needed for the connection.

3. In an optical cable according to claim 2, wherein the connector box is designed for an active coupling via a transmitter and a receiver.

4. In an cable connecting network according to claim 2, wherein the connector box is usable for passive coupling in the sense of light waveguide branching.

5. An optical cable network constructed with light waveguide cables for one or more transmission systems, including ring systems, star systems and bus systems, said network comprising a plurality of existing and planned connecting points for individual system nodes, said network including all of the existing and planned connecting parts of the cable network being connected in series with one another by means of a prescribed plurality of through light waveguide leads, which are each composed of two fibers, in one or more light waveguide cables, a number of leads of said plurality of through light waveguide leads being determined based on the maximum size of the network, the through light waveguide leads being laid in multiple loops at each connecting point for forming a cable reserve and only the light waveguide leads required for forming a connection at a particular connecting point being cut to provide free ends which are connected to a corresponding system component with a splice technique.

6. An optical cable network according to claim 5, which includes a connector box for each of the existing connecting points and for each of the planned connecting points, each connector box receiving the cable loops for the connecting point and receiving system components for forming the connection at said connecting point.

* * * * *